May 9, 1950
C. H. OTTO
2,507,264
FEED TROUGH FOR ANIMALS
Filed Oct. 24, 1945
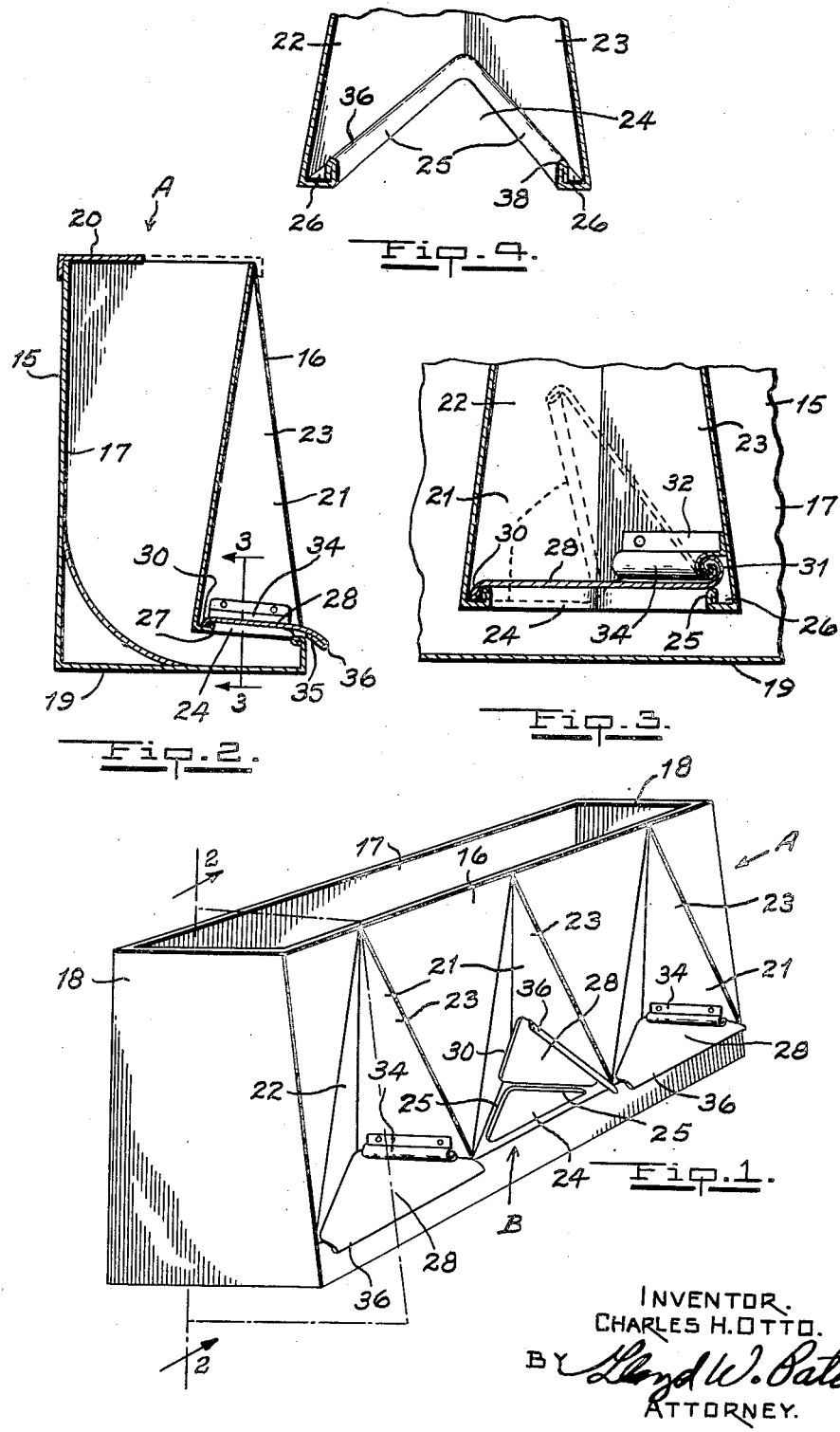
INVENTOR.
CHARLES H. OTTO.
BY Lloyd W. Batch
ATTORNEY.

Patented May 9, 1950

2,507,264

UNITED STATES PATENT OFFICE 2,507,264

FEED TROUGH FOR ANIMALS

Charles H. Otto, Cedar Rapids, Iowa, assignor to Charles W. Otto, Evanston, Ill.

Application October 24, 1945, Serial No. 624,220

5 Claims. (Cl. 119—52)

This invention relates to feed troughs for animals and has more particular reference to devices of this nature for the feeding of animals such as hogs.

One of the objects of the present invention is to provide a device of this character where access to the feed trough for feeding purposes is effected by the animal itself.

Another object of the present invention is to provide a device of this character having a plurality of feed spaces or openings, and in which the structure is so arranged that an animal, such as a hog, may not occupy more than one feed space or opening at a time during feeding.

A further object of the present invention is to provide a device of this character wherein the trough as a whole is closed against weather and other conditions for sanitary purposes and wherein the feed openings of the trough are provided with automatically closable cover members.

Still another object of the present invention is to provide a device of this character wherein the animal raises the feed door or cover with its snout and wherein the feed door or cover is self-closing when the animal has finished feeding.

Yet a further object of the present invention is to provide a device of this character which guard against injury to the animal's head in the use and operation of the device.

Still a further object of the invention is to provide a device of this character which is novel yet simple in form, rugged in nature and one that will the more satisfactorily perform the functions required of it.

Having regard to the foregoing and other objects and advantages which will become apparent as the description proceeds and the details become known, the invention consists essentially in the novel combination and arrangement of parts hereinafter described in more particular detail and illustrated in the accompanying drawings in which:

Fig. 1 is a perspective view of an embodiment of the present invention showing one of the feed doors raised to open feeding position and with the feed hopper cover removed.

Fig. 2 is a vertical sectional view taken substantially on line 2—2 of Figure 1.

Figure 3 is an enlarged fragmentary section taken on the line 3—3 of Fig. 2 and

Fig. 4 is an enlarged fragmentary perspective view of the feed opening structure shown partly in section substantially on line 3—3 of Fig. 2, and with the door and hinge omitted.

Referring now to the accompanying drawings disclosing an embodiment of the present invention wherein like letters and numerals of reference designate corresponding parts in the various illustrations, the letter A indicates the invention as a whole while the letter B indicates the feed sections of the trough generally.

As presently disclosed, the main body or housing 15 is arranged and constructed in substantially hopper-like form, such housing being designed to receive grain or other types of animal food. Broadly speaking, the housing comprises front and rear walls 16 and 17 respectively, end walls 18 and bottom wall 19. The top section of the body or housing is open throughout its length for purposes of replenishing the food supply while a cover or closure member 20 may be hingedly or otherwise connected thereto to protect the food content against weather conditions, insects, etc.

For manufacture and utility, sheet metal offers many advantages in structure and use in devices of this character. Thus while I prefer to employ sheet metal of a suitable type and gauge in the fabrication of the feeders, I wish it to be clearly understood that such expression is not used in a limitative sense and that wood or plastic or a combination of wood, plastic and metal may be employed in the structure without departing from the spirit of the invention.

As more particularly observed in Figs. 1 and 2, the front wall 16 preferably slopes upwardly and rearwardly at an angle from bottom 19. Extending inwardly from the front wall 16 is a wall structure which forms a series of inwardly extending wells 21. The structure forming the wells comprises a series of substantially triangular shaped, angularly disposed, wall forming sections 22 and 23 which extend inwardly toward the interior of the hopper and upwardly in gradually diminishing V shape form where they merge with the upper part of front wall 16. From the foregoing it will be seen that I provide a series of wells 21, one for each feed trough opening wherein the wall structure of the wells separate the trough openings into independent feed sections.

The base of the walls in the well sections terminate around feed openings 24 and it is through these openings that the animals such as hogs have access to the food deposited in the hopper. The feed openings 24 are conveniently shown in substantially triangular form and provided with upturned rim or flange-like wall sections 25 which embrace two sides of the openings and form channels 26 at the sides thereof as indicated in Figs. 1 and 4. While I show triangular openings as a matter of convenient illustration, it will be understood that other shaped openings such as circular, oval, etc., may be employed within the scope of the invention. Additionally, the base of the channels are arranged at an angle upwardly and rearwardly inclined to the horizontal as indicated at 27 so that water is prevented from entering the trough openings 24 and will automatically drain to the front and exterior of the feeder.

The doors or cover members for the feed trough openings 24 are indicated by the numeral 28. These door or cover members are illustrated as being of substantially triangular shape in plan to conform to general contour of the openings and are designed to fit over such trough openings and normally remain closed in order to protect the food content in the hopper when not in use but, when required for feeding purposes, the doors or covers 28 may be moved angularly upwardly and inwardly to open position by the animal with its snout as will be later described.

In order to protectively surround as well as close the trough openings, the door members 28 are provided with down-turned sides and rear edges 30 which are adapted to fit into the channels 26. A portion of one of the side walls of the door members extends outwardly in curved, approximately spiral form in cross section as indicated at 31 and is adapted to engage a wall bracket 32 of similar form in cross section to form a hinge connection 34 for the door or cover member. The hinge may, of course, be arranged on the wall 23 or the wall 22 as desired.

As particularly observed in Figs. 1 and 2, the front ends of the doors or cover members 28 are provided with infolded sections 35 which extend outwardly beyond the front wall 16 of the body member in the form of an engaging lip 36. This lip member serves as a medium through which the door members 28 are raised by the snout of the animal in order that it may gain access to the food through the trough openings 24. In addition to the foregoing it will be observed that the hinge connection is mounted on the inwardly and angularly sloping wall 23. Thus, the door members 28 will move inwardly, upwardly and away from the front of the feed trough opening but may not be opened to a vertical position. As a result therefore when the animal withdraws its head after feeding, the door or cover will, by gravitational influence, automatically close over the feed trough opening 24.

To guard against injury to the animals in operating the device or during or after feeding, the various parts of the doors and trough openings are suitably curved or rounded. By this arrangement a twofold purpose is served, first injury to the animal is guarded against and second, the various parts and sections are provided with reinforcement. To this end then the corners of the feed trough openings 24 are rounded and curved as indicated at 38 while the channel forming walls there around are downturned as indicated at 39 all of which eliminates rough, pointed or otherwise objectionable surfaces. Similar provision is also made in the structure of the door members 28 wherein it is observed that the downturned sections of the doors and the protruding lip members 36 are infolded to afford smooth, even surfaces.

From the foregoing it will be seen that I provide structure which divides the feed troughs into a series of independent and separate feed sections which are divided by wall structure so that it is extremely difficult, if not impossible, for an animal to occupy more than one feed section or opening at one time. In other words, the animal could not reasonably stand in one section or opening while feeding in another section or opening as appears to be characteristic of hogs at feeding time. Further, each section or opening is provided with an individual door which the animal operates with its snout for opening purposes and which automatically closes when the animal withdraws its head after feeding.

*Operation*

In operation, and with the necessary grain or other type of feed in the hopper, the animals or hogs come forward and by engaging the protruding lip 36 with their snouts, open the door, which gives them access to the trough or feed opening through which they feed. When the animal has finished feeding, it simply withdraws its head and the door or cover member automatically closes.

Many changes may be made in the above and many different embodiments constructed without departing from the spirit or the essential characteristics of the invention. It is intended therefore that the present disclosure is illustrative rather than restrictive and all changes coming within the meaning and range of equivalency of the claims are intended to be embraced therein.

What I claim as my invention is:

1. A feed trough for animals comprising a substantially hopper-like body having a substantially flat bottom wall surrounded by upstanding front and back and end walls, inwardly extending wall portions at the forward side above said bottom wall having a series of feed trough openings therethrough, well-forming wall structure comprising wall portions extending upwardly around and on the inside of each feed opening in a series of well-like separate feed sections around said openings, and hingedly-connected door means normally closing over the feed trough openings and having extensions engageable at the front by the snout of an animal for opening purposes.

2. A feed trough for animals as claimed in claim 1 wherein each door means is hingedly mounted in position so that the wall of the well prevents said door from opening to and beyond a vertical position thereby stopping said door in an unbalanced position and causing the said door to automatically close when released by the animal.

3. A feed through for animals comprising a hopper-like body having a substantially flat bottom wall with front and back and end walls rising therearound, rearwardly extending wall portions spaced above the bottom wall and having a series of feed trough openings therethrough in spaced relation, well-forming structure of substantially V-shape in horizontal section extending inwardly from the front wall and upwardly at an angle in gradually diminishing converging form around the inner sides of said feed trough openings, and hingedly connected closure members for the feed trough openings, each of said closure members being provided with a lip protruding forwardly beyond the front wall of the body portion and thus engageable by the snout of an animal to be opened by said animal.

4. A feed trough for animals comprising a substantially hopper-like body member having a substantially flat bottom wall with upstanding front and back and end walls, wall structure extending inwardly above the bottom wall having a spaced-apart series of openings of substantially triangular form in plan with said openings spaced apart and each opening having a base side thereof presented forwardly, wall structure extending inwardly and upwardly around the insides of the triangular openings in substantially V-shaped horizontal cross-section and gradually diminishing at their tops to merge substantially with the front wall to provide a series of well-defining wall portions around the feed trough openings sub-dividing the forward side into a spaced and separated series of feed sections, and hingedly connected closure members normally dropping by gravity for closing the feed trough openings.

5. A feed trough for animals as claimed in claim 4 wherein each feed trough opening is provided with upturned reinforcing flange wall structure around the rear sides of the openings and each closure member is provided with at least one down-turned reinforcing flange edge to embrace an upturned wall when the closure member is in closed position.

CHARLES H. OTTO.

REFERENCES CITED

The following references are of record in the file of this patent:

UNITED STATES PATENTS

| Number | Name | Date |
|---|---|---|
| 1,815,512 | Kopetka | July 21, 1931 |
| 1,844,610 | Smidley | Feb. 9, 1932 |
| 1,910,596 | Einsel et al. | May 23, 1933 |